United States Patent [19]

Zilbert

[11] Patent Number: 5,277,861
[45] Date of Patent: Jan. 11, 1994

[54] INDUSTRIAL DRUM MOLDING

[75] Inventor: Seymour Zilbert, Demarest, N.J.

[73] Assignee: Bergen Barrel & Drum Co., Kearny, N.J.

[21] Appl. No.: 849,108

[22] Filed: Mar. 9, 1992

Related U.S. Application Data

[62] Division of Ser. No. 595,997, Oct. 11, 1990, Pat. No. 5,116,213.

[51] Int. Cl.$^5$ .................. B29C 41/18; B29C 41/42
[52] U.S. Cl. .................. 264/255; 249/102;
264/297.6; 264/297.8; 264/302; 264/310;
264/334; 425/183; 425/434; 425/435; 425/441;
425/451.9
[58] Field of Search ............... 425/183, 425, 429, 430,
425/435, 441, 451.9, 434; 264/301, 302, 310,
311, 130, 297.6, 297.8, 332, 337, 255, 334;
249/102

[56] References Cited

U.S. PATENT DOCUMENTS

| | | | |
|---|---|---|---|
| 1,423,284 | 7/1922 | Weaver | 249/102 |
| 2,042,975 | 6/1936 | West | 264/311 |
| 3,197,827 | 8/1965 | Haughton et al. | 264/311 X |
| 3,214,506 | 10/1965 | Corbin, Jr. | 264/310 |
| 3,683,061 | 8/1972 | Gates | 264/311 X |
| 3,861,640 | 1/1975 | Agneta | 249/102 |
| 3,871,611 | 3/1975 | Taketa | 249/102 |
| 4,004,773 | 1/1977 | Binder | 249/102 X |
| 4,094,432 | 6/1978 | Filbert | 220/404 |
| 4,714,578 | 12/1987 | Cagle et al. | 264/311 X |
| 4,818,211 | 4/1989 | Weidman et al. | 264/311 X |
| 4,847,028 | 7/1989 | Snyder et al. | 264/310 X |
| 5,082,614 | 1/1992 | Hartmann et al. | 249/102 X |

FOREIGN PATENT DOCUMENTS 2031951 11/1970 France.

Primary Examiner—Karen Aftergut
Attorney, Agent, or Firm—Samuelson & Jacob

[57] ABSTRACT

Method for selectively rotationally molding an industrial drum in either a closed-head configuration or an open-head configuration within a mold constructed for selective modification to accomplish molding of the drum in either selected configuration by inserting or deleting a separator between a first mold cavity for forming the body of the drum and a further mold cavity for forming the head of the drum, the further mold cavity being selected from alternate second and third mold cavities, such that both the body and the head are rotationally molded simultaneously within the mold during molding of either configuration of the industrial drum.

4 Claims, 3 Drawing Sheets

INDUSTRIAL DRUM MOLDING

This is a division of application Ser. No. 07/595,997, filed Oct. 11, 1990, now U.S. Pat. No. 5,116,213.

The present invention relates generally to the manufacture of industrial drums and pertains, more specifically, to the rotational molding of industrial drums of synthetic polymeric materials in the closed-head configuration and in the open-head configuration of such drums.

Industrial drums constructed of synthetic polymeric materials and emulating structural features of commercially available conventional steel industrial drums have been manufactured successfully by rotational molding and have met with widespread commercial acceptance. As set forth in U.S. Pat. No. 4,094,432, desirable structural features of conventional industrial drums can be carried over into industrial drums constructed of synthetic polymeric materials, while added advantages provided by the use of a synthetic polymeric material, such as corrosion resistance and ease of maintenance, are realized.

Industrial drums of the type described above generally are supplied in two basic configurations; namely, the closed-head configuration in which the head of the drum is unitary with the body of the drum, and the open-head configuration, in which the head is selectively attached to and detached from the body of the drum. The relatively large facilities and extensive molding apparatus required for the rotational molding of industrial drums, coupled with the usually mixed demand for one or the other of the above-described drum configurations, militate against dedicating an entire production facility to the manufacture of just one of the drum configurations. Since the demand for one or the other of the two drum configurations may vary from time to time, it would be advantageous to be able to select the number of each of the two configurations to be molded in any particular production run, without the necessity for extensive changes in tooling and the consequent delay engendered by the necessity for making tooling changes in the production apparatus.

The present invention provides apparatus and method by which industrial drums of synthetic polymeric materials are manufactured utilizing rotational molding in molding apparatus selectively adapted for the molding of drums of one or the other of the closed-head configuration and the open-head configuration such that any production run can be comprised of either configuration or any selected mix of both configurations. As such, the present invention has several objects and advantages, some of which are summarized as follows: Enables the manufacture of industrial drums of synthetic polymeric materials by rotational molding in apparatus selectively adapted for molding a closed-head drum configuration or an open-head drum configuration with a minimal changeover upon selecting one configuration or the other; makes effective use of rotational molding facilities for the economical manufacture of industrial drums in production runs comprising configurations selected from the closed-head configuration and the open-head configuration of such drums; provides molding apparatus readily adapted to the rotational molding of a selected one of either a closed-head industrial drum or an open-head industrial drum for uninterrupted production of industrial drums of either selected configuration; enables flexibility of production with lowered manufacturing cost for providing rotationally molded industrial drums of synthetic polymeric materials in both closed-head and open-head configurations; and assures uniform high quality in industrial drums rotationally molded of synthetic polymeric materials in either a closed-head or an open-head configuration.

The above objects and advantages, as well as further objects and advantages, are attained by the present invention which may be described briefly as apparatus and method for making an industrial drum of synthetic polymeric material by rotational molding, the construction of the industrial drum including a tubular body having a head end and a head at the head end of the body, the industrial drum having a configuration selected from alternate configurations including a closed-head configuration in which the head is molded unitary with the body at the head end, and an open-head configuration in which the head is separate from the body at the head end of the body, the apparatus and method comprising: means for and the step of rotational molding the tubular body of the industrial drum in a first mold cavity; means for and the step of rotational molding the head of the industrial drum in a further mold cavity selected from second and third mold cavities for placement adjacent the first mold cavity such that upon rotational molding of the industrial drum, the head and the body will be molded simultaneously; and means for and the step of selectively interposing separator means between the first mold cavity and the selected further mold cavity upon selection of the third mold cavity and removing the separator means from between the first mold cavity and the selected further mold cavity upon selection of the second mold cavity such that upon rotational molding of the industrial drum with the separator means removed from between the first mold cavity and the corresponding selected further mold cavity, the head will be molded simultaneous and unitary with the body to establish the closed-head configuration, and upon rotational molding of the industrial drum with the separator means interposed between the first mold cavity and the corresponding selected mold cavity, the head will be molded simultaneous and separate from the body to establish the open-head configuration.

The invention will be understood more fully, while still further objects and advantages will become apparent, in the following detailed description of preferred embodiments of the invention illustrated in the accompanying drawing, in which.

Figure 1:
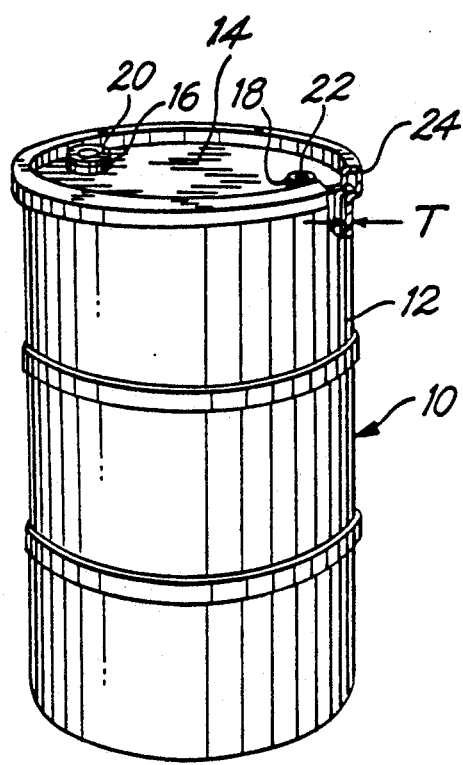
FIG. 1 is a perspective view, partially broken away, of a closed-head industrial drum manufactured in accordance with the present invention.

Referring now to the drawing, and especially to FIG. 1 thereof, an industrial drum 10 is constructed of a synthetic polymeric material in a closed-head configuration in which the wall of the drum 10 has a prescribed wall thickness T and is in the form of a tubular body 12 molded unitary with a head 14 at the head end of the body 12. The tubular body 12 has a generally cylindrical configuration which essentially emulates the body of a conventional closed-head steel drum, while the head 14 includes bung openings at 16 and 18 threaded to accept standard complementary closures 20 and 22, respectively. A chime 24 is molded unitary with the body 12 and head 14 and has a configuration essentially emulating the chime of a conventional steel drum.

Figure 2:
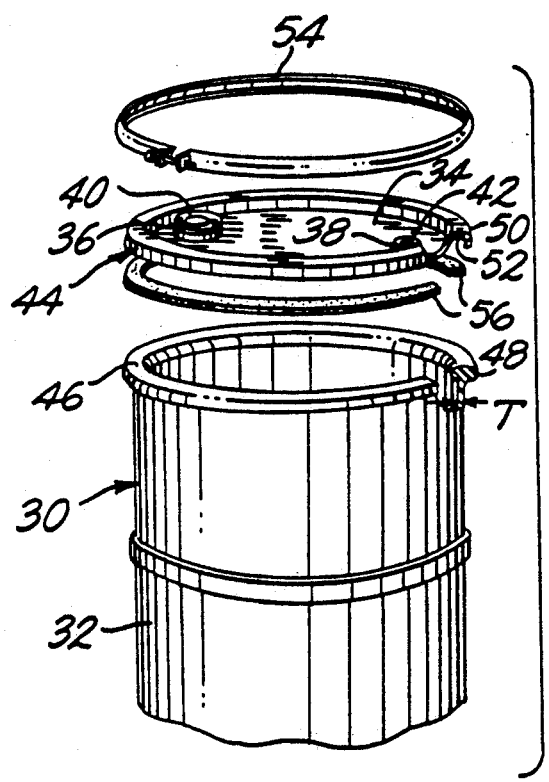
FIG. 2 is a fragmentary perspective view, exploded and partially broken away, of an open-head industrial drum manufactured in accordance with the present invention.
Figure 3:
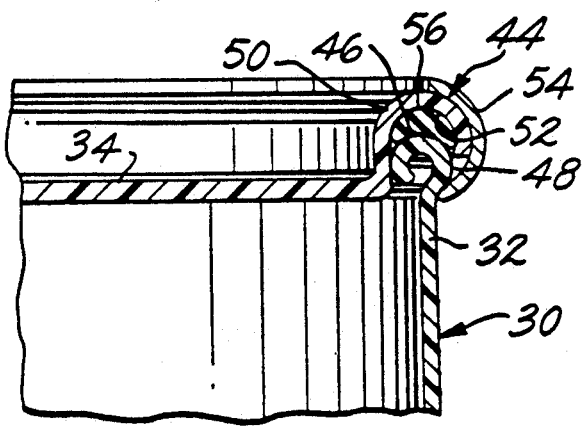
FIG. 3 is a fragmentary cross-sectional view of a portion of the drum of FIG. 2, with the head affixed to the body of the drum.

Turning to FIGS. 2 and 3, an industrial drum 30 is constructed of a synthetic polymeric material in an open-head configuration having a wall thickness T and in which a tubular body 32 is separate from a head 34. The tubular body 32 has a generally cylindrical configuration which essentially emulates the body of a conventional open-head steel drum, while the head 34 includes bung openings at 36 and 38 threaded to accept standard complementary closures 40 and 42, respectively. A chime portion 44 is molded unitary with the head 34. The tubular body 32 includes an open end 46 and a bead 48 is molded unitary with the tubular body 32 at the open end 46 thereof. The chime portion 44 of head 34 includes a flange 50 having an annular recess 52 generally complementary to the bead 48 so that upon affixing the head 34 to the body 32, the bead 48 will be seated within the recess 52 of flange 50, as shown in FIG. 3. A split band 54, preferably of steel, is fitted over the engaged bead 48 and flange 50 and is tightened to secure the head 34 in place upon the body 32, in a manner known in conventional steel drums. Preferably, a seal 56 is placed between the head 34 and the body 32 at the open end 46 to assure appropriate sealing of the open end 46.

Figure 4:
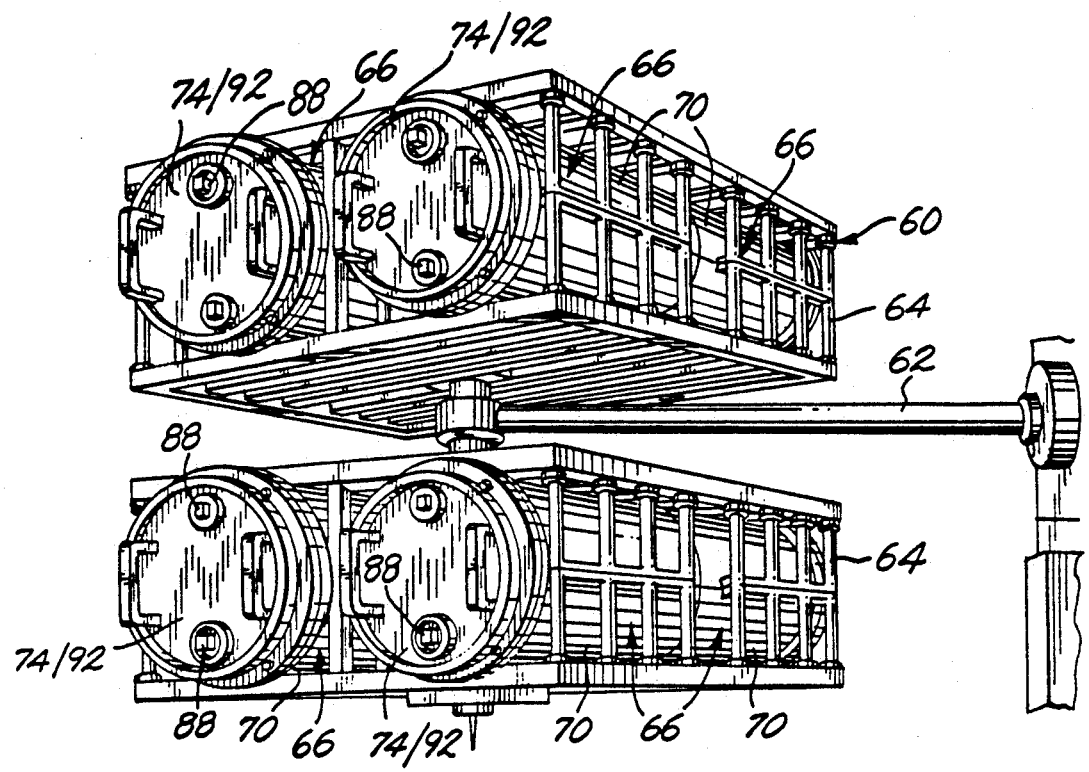
FIG. 4 is a pictorial view of a portion of a rotational molding apparatus in which the industrial drums are manufactured in accordance with the present invention.

Referring now to FIG. 4, a portion of an apparatus for rotationally molding either industrial drum 10 or industrial drum 30 is illustrated at 60 and is seen to include an arm 62 which carries cages 64 within which there is mounted a plurality of mold means shown in the form of molds 66. Arm 62 manipulates molds 66 so that each mold 66 may be charged with polymer powder, closed and then indexed, along with cages 64, into an oven (not shown) for heating, and for rotation while heated, in a manner now well-known in the art of rotational molding. Subsequently, the molds 66 are cooled and opened to release the completed drums, and the process is repeated.

Figure 5:
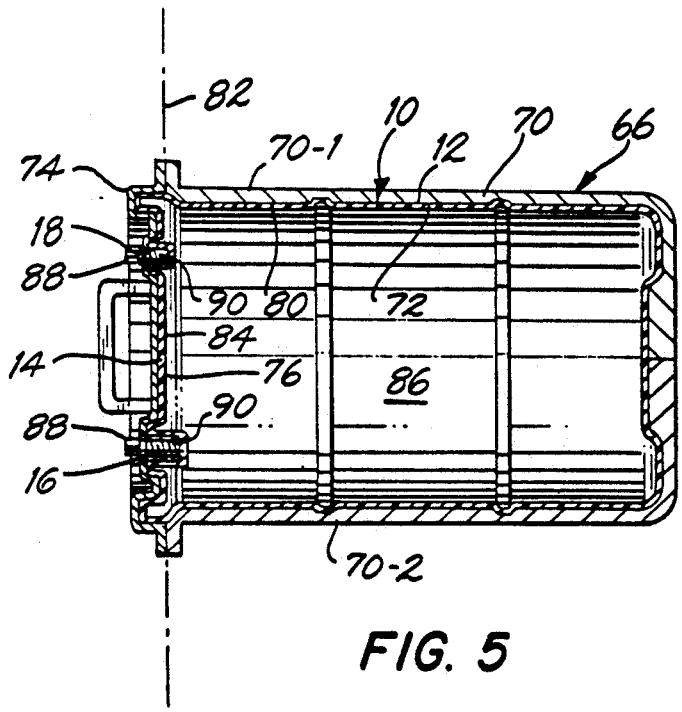
FIG. 5 is a longitudinal cross-sectional view of a mold employed in the apparatus of FIG. 4 in rotationally molding the closed-head drum of FIG. 1.
Figure 6:
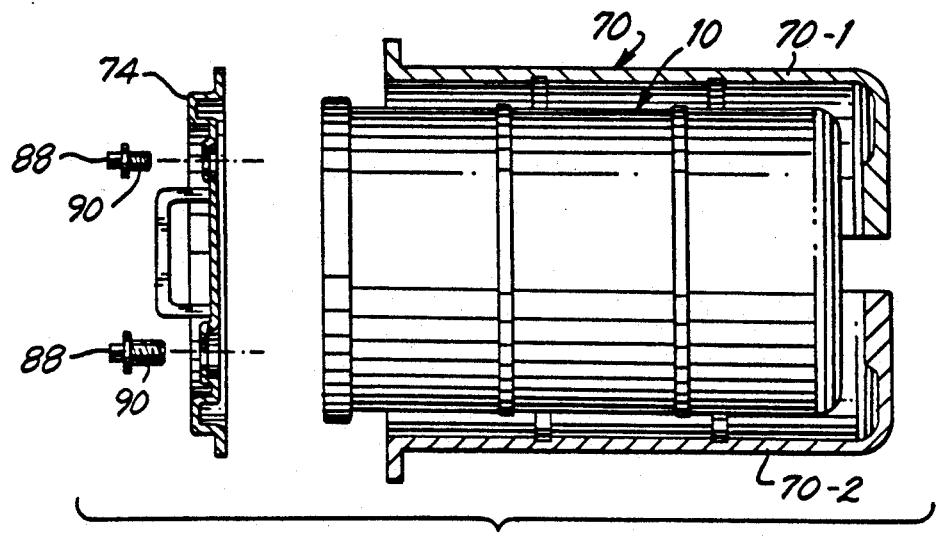
FIG. 6 is an exploded longitudinal cross-sectional view of the mold and of the drum manufactured in the mold, as shown in FIG. 5.

In the arrangement illustrated in FIGS. 5 and 6, each mold 66 includes a first mold member 70 providing a first mold cavity 72 and a second mold member 74 providing a further mold cavity 76. The first and second mold members 70 and 74 are assembled so that the mold cavities 72 and 76 ar integrated and contiguous; that is, the interior surface 80 of the first mold cavity 72 is joined at a parting line 82 with the interior surface 84 of the mold cavity 76 so that one continuous interior cavity 86 is provided for molding the closed-head industrial drum 10 with the body 12 formed within mold cavity 72 and the head 14 formed within mold cavity 76. A pair of plugs 88 are fitted within the second mold member 74, each plug 88 including a threaded core 90 for forming a corresponding threaded bung opening 16 and 18. During the molding operation, synthetic polymeric material placed within the mold 66 in powder form will melt and be forced against the interior surfaces 80 and 84 of the mold cavities 72 and 76 until the molten material is spread out to the desired wall thickness T and takes the form of the completed drum 10. Upon completion of the drum 10, the plugs 88 are removed, the second mold member 74 is disassembled from the first mold member 70 and the completed drum 10 is removed from mold 66 of the mold means. Preferably, the first mold member 70 is constructed in two parts 70-1 and 70-2 which are spread apart laterally in order to facilitate release of the completed drum 10, as illustrated in FIG. 6.

Figure 7:
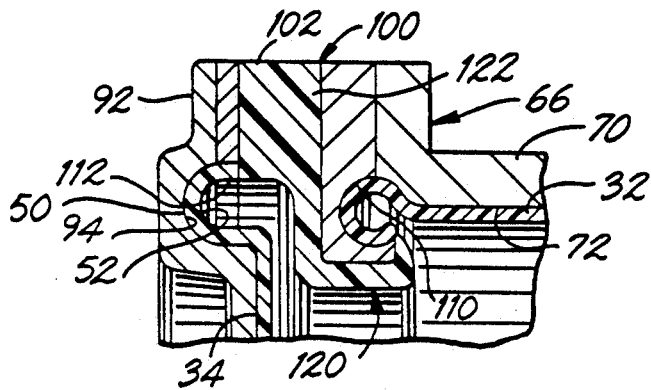
FIG. 7 is an enlarged fragmentary view of a portion of the mold of FIG. 5, modified and employed in the apparatus of FIG. 4 in rotationally molding the open-head drum of FIG. 2.
Figure 8:
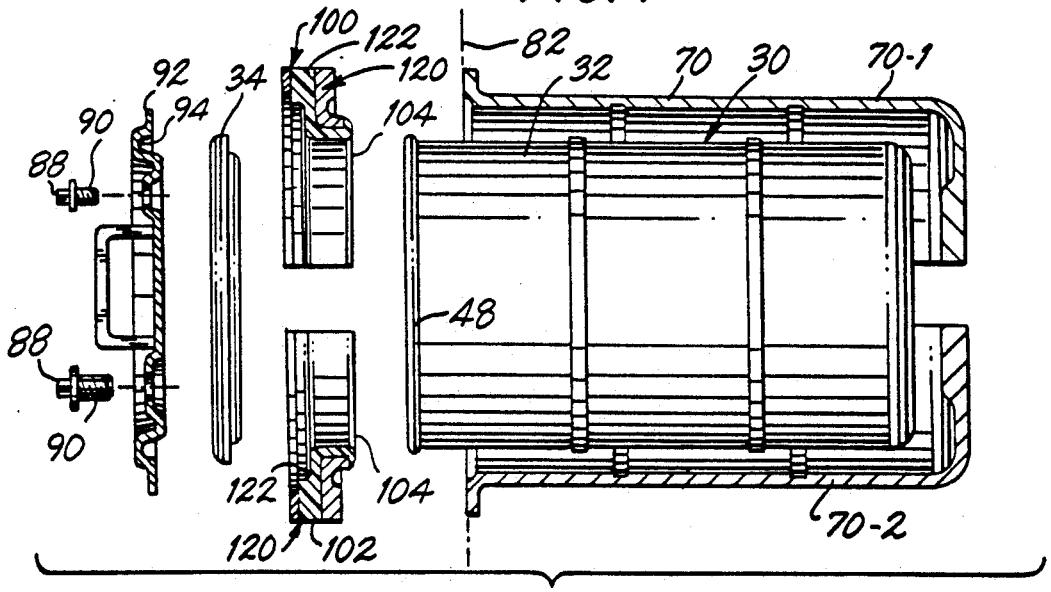
FIG. 8 is an exploded longitudinal cross-sectional view of the mold and of the drum manufactured in the mold, as shown in FIG. 7.

Turning now to FIGS. 7 and 8, when it is desired to mold the open-head industrial drum 30, a third mold member 92 is assembled with first mold member 70, in place of second mold member 74, to provide mold 66 with a further mold cavity 94, and separator means, shown in the form of a separator 100, is interposed between the first mold member 70 and the third mold member 92 of the mold 66. Although the separator means may be made integral with third mold member 92, construction is simplified by making separator 100 in the form of a ring 102, preferably segmented to include circumferentially extending segments 104, separately placed at the parting line 82 between the first mold member 70 and the third mold member 92 so that when the first mold member 70 is assembled with the third mold member 92, the ring 102 lies between the first and third mold members 70 and 92 and spaces the first mold cavity 72 from the further mold cavity 94. Ring 102 includes a first supplemental mold cavity 110 placed contiguous with the first mold cavity 72 and a second supplemental mold cavity 112 placed contiguous with further mold cavity 94. A dam 120 is located intermediate the first and second supplemental mold cavities 110 and 112 so as to be placed interjacent the first and further mold cavities 72 and 94. Upon molding of the industrial drum 30, the bead 48 will be formed unitary with the body 32 of the drum 30 by virtue of the first mold cavity 72 and the first supplemental mold cavity 110. The flange 50 and recess 52 will be formed unitary with the head 34 by virtue of the corresponding selected further mold cavity 94 and the second supplemental mold cavity 112. The head 34 will be molded simultaneous with and separate from the body 32 by virtue of the dam 120 which divides the mold cavities 72, 110 and 94, 112 so that the body 32 and the head 34 will be separate. Upon completion of the drum 30, the plugs 88 are removed, the third mold member 92 is disassembled from the ring 102 and the first mold member 70, and the completed drum 30 is removed from the mold means. As described above, the first mold member 70 preferably is constructed in two parts 70-1 and 70-2 which are spread apart laterally in order to facilitate release of the completed drum 30, as illustrated in FIG. 8. The drum 30 is released with the head 34 separate from the body 32, with no further operations required in order to separate the head 34 from the body 32.

The dam 120 preferably is in the form of a segmented annular member 122 of a material to which the synthetic polymeric material of drum 30 will not adhere during the molding process. One such material is a fluoroplastic, such as TEFLON. Annular member 122 extends radially inwardly, in the direction into the interior of the mold cavities 72, 110 and 94, 112 provided by the mold members 70 and 92 and the ring 102, a distance great enough to extend beyond the wall thickness T of the completed drum 30 so that separation of the head 34 from the body 32 not only is assured, but is accomplished cleanly, and essentially no further finishing operations are necessary in order to produce a fully usable open-head industrial drum as the drum 30 emerges from the mold 66.

As is apparent from the above description, the selection of one of the second mold member 74 and the third mold member 92, together with the selective removal and interposition of the separator 100 enables ready conversion of any of the molds 66 from a mold for manufacturing a closed-head industrial drum 10 to a mold for manufacturing an open-head industrial drum 30, without disturbing the remainder of the molding apparatus and facility. Accordingly, closed-head drums and open-head drums may be manufactured in the same production run, intermixed in any sequence, in order to make up the appropriate number of drums of each type. Since the mold member 70 is the same for either the closed-head drum 10 or the open-head drum 30, the expense of constructing entirely different mold members for each type of drum is eliminated. The rotational molding process is rendered even more economical and it becomes feasible to expedite the manufacture of both types of industrial drums in a single facility.

It will be seen that the above described invention attains several objects and advantages, some of which are summarized as follows: Enables the manufacture of industrial drums of synthetic polymeric materials by rotational molding in apparatus selectively adapted for molding a closed-head drum configuration or an open-head drum configuration with a minimal changeover upon selecting one configuration or the other; makes effective use of rotational molding facilities for the economical manufacture of industrial drums in production runs comprising configurations selected from the closed-head configuration and the open-head configuration of such drums; provides molding apparatus readily adapted to the rotational molding of a selected one of either a closed-head industrial drum or an open-head industrial drum for uninterrupted production of industrial drums of either selected configuration; enables flexibility of production with lowered manufacturing cost for providing rotationally molded industrial drums of synthetic polymeric materials in both closed-head and open-head configurations; and assures uniform high quality in industrial drums rotationally molded of synthetic polymeric materials in either a closed-head or an open-head configuration.

It is to be understood that the above detailed description of preferred embodiments of the invention is provided by way of example only. Various details of design, construction and procedure may be modified without departing from the true spirit and scope of the invention as set forth in the appended claims.

The embodiments of the invention in which an exclusive property or privilege is claimed are defined as follows:

1. The method for making a plurality of industrial drums of synthetic polymeric material by rotational molding, the industrial drums each having a construction including a tubular body having a head end and a head at the head end of the body, the industrial drums each having a configuration selected from alternate configurations including a closed-head configuration in which the head is molded unitary with the body at the head end, and an open-head configuration in which the head is molded separate from the body at the head end of the body, the method comprising:

rotational molding the tubular body of each industrial drum from synthetic polymeric material in a first mold cavity;

rotational molding the head of each industrial drum from synthetic polymeric material in a further mold cavity selected from second and third mold cavities and placed adjacent a corresponding first mold cavity such that upon rotational molding of the plurality of industrial drums, the head and the body of each drum are molded simultaneously in adjacent mold cavities;

selecting the second mold cavity as the further mold cavity for molding each one of at least some of the plurality of industrial drums in each selected second mold cavity and corresponding first mold cavity with the head molded simultaneously and unitary with the body to produce the closed-head configuration in each one of the at least some of the plurality of industrial drums; and p1 selecting the third mold cavity as the further mold cavity for molding each one of at least others of the plurality of industrial drums, and interposing separator means between each selected third mold cavity and corresponding first mold cavity for molding each one of the at least others of the plurality of industrial drums in each selected third mold cavity and corresponding first mold cavity with the head molded simultaneously with and separate from the body to produce the open-head configuration in each one of the at least others of the plurality of industrial drums, such that the open-head configuration emerges from each selected third mold cavity and corresponding first mold cavity essentially in a fully usable form.

2. The method of claim 1 wherein each second mold cavity is placed contiguous with the corresponding first mold cavity.

3. The method of claim 1 wherein the head end of the body and the head of the open-end configuration in each one of the at least others of the plurality of industrial drums include complementary engagement means, and the method includes interposing supplemental mold cavity means between the corresponding first mold cavity and the third mold cavity as the selected further mold cavity for molding the complementary engagement means simultaneously with the molding of the body and the head of the open-head configuration in each one of the at least others of the plurality of industrial drums.

4. An improvement in the method for making a plurality of industrial drums of synthetic polymeric material by rotational molding the industrial drums each having a construction including a tubular body having a head end and a head at the head end of the body, the industrial drums each having a configuration selected from alternate configurations including a closed-head configuration in which the head is molded unitary with the body at the head end, and an open-head configuration in which the head is molded separate from the body at the head end of the body, and wherein the tubular body of each industrial drum is rotational molded from synthetic polymeric material in a first mold cavity, the improvement comprising:
rotation molding the head of each industrial drum from synthetic polymeric material in a further mold cavity selected from second and third mold cavities and placed adjacent a corresponding first mold cavity such that upon rotation molding of the plurality of industrial drums, the head and the body of each drum are molded simultaneously; and
selecting the third mold cavity as the further mold cavity for molding each one of at least some of the plurality of industrial drums, and interposing separator means between each selected third mold cavity and corresponding first mold cavity for molding each one of the at least some of the plurality of industrial drums in each selected third mold cavity and corresponding first mold cavity with the head molded simultaneously with and separate from the body to produce the open-head configuration in the at least some of the plurality of industrial drums, such that the open-head configuration emerges from each selected third mold cavity and corresponding first mold cavity essentially in a fully usable form.

* * * * *